Sept. 28, 1965 K. JUNG ETAL 3,209,150
COOLABLE MULTI ELEMENT INFRARED DETECTOR ASSEMBLY
Filed Feb. 12, 1962 3 Sheets-Sheet 1
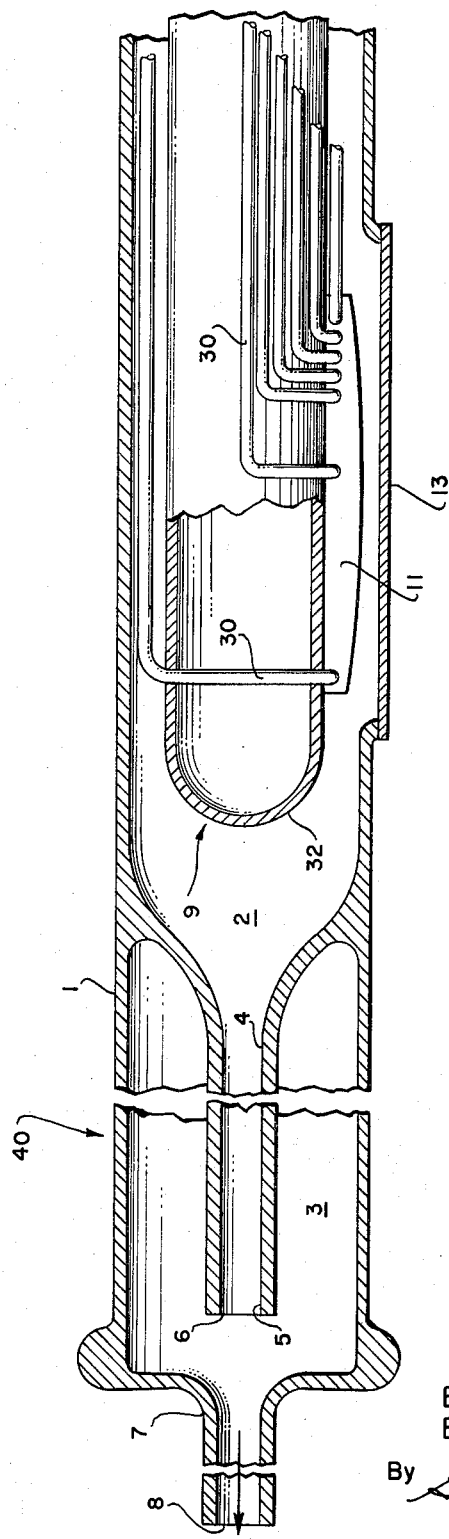
FIG_1a
INVENTORS
KURT JUNG
EDGAR W. KUTZSCHER
ELVIN S. BRUMFIELD
By *George C. Sullivan*
Agent

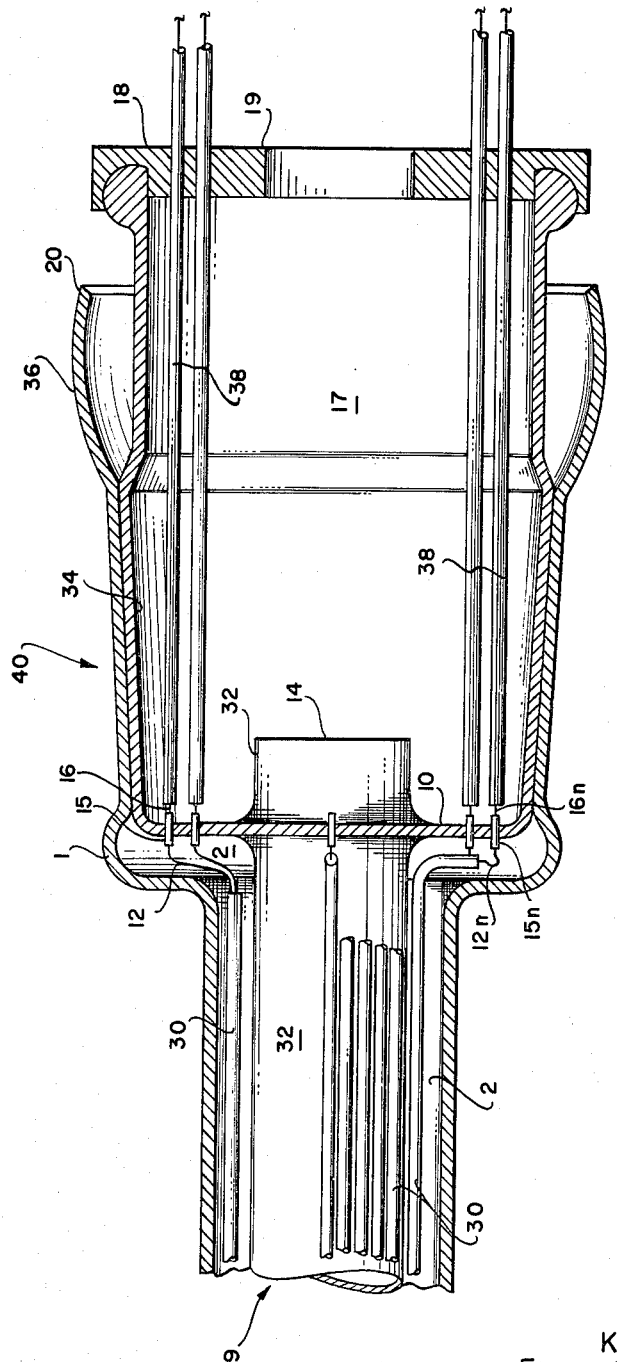
FIG_1b

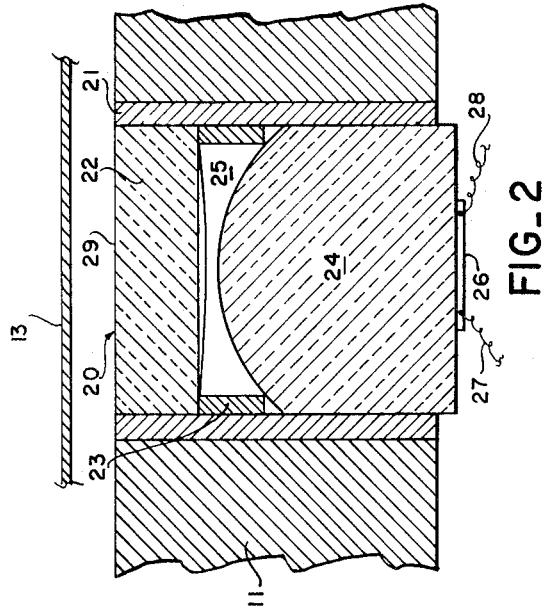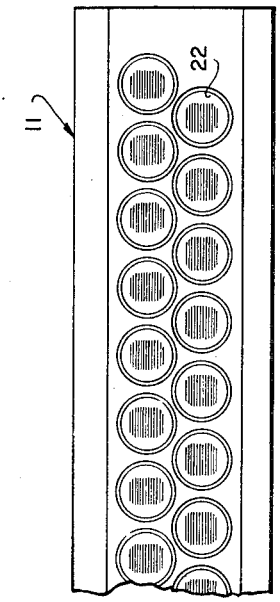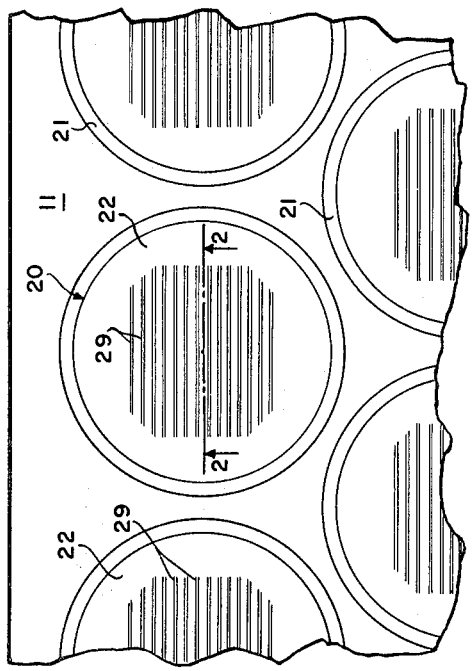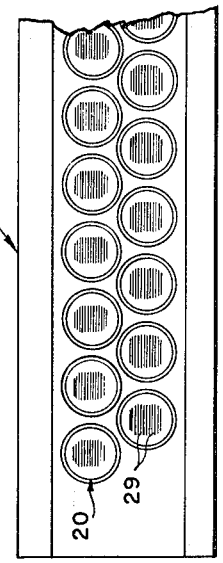

United States Patent Office 3,209,150
Patented Sept. 28, 1965

3,209,150
COOLABLE MULTI ELEMENT INFRARED
DETECTOR ASSEMBLY
Kurt Jung and Edgar W. Kutzcher, Sherman Oaks, and
Elvin S. Brumfield, Temple City, Calif., assignors to
Lockheed Aircraft Corporation, Burbank, Calif.
Filed Feb. 12, 1962, Ser. No. 172,587
13 Claims. (Cl. 250—83.3)

This invention relates generally to search systems and more particularly to an infrared detector assembly employing an array of infrared cells and associated optical systems.

The design of infrared search systems involving arrays of detectors involves a consideration of many factors. Some of these factors relate to methods of discriminating between target radiant energy and background radiant energy, methods of increasing the sensitivity of the detectors, and a consideration of the problems caused by thermal gradients in the system.

When the target is a point source of radiation, reticles in the optical system provide a convenient way to discriminate between the target and general background radiation, because the detectors in cooperation with the reticles will modulate a point source target differently from the way the background is modulated. However, when the search system is used for long-range detection, the thermal radiation from these reticles becomes comparable with the thermal radiation from the target so that the "noise" level of the system becomes a limiting factor in target detection.

In addition, it is necessary for the reticles to be in the focal plane of the optical system in order for the search system to operate properly. However, thermal gradients tend to vary the position of the focal plane and to "de-focus" the optical system from the point of view of the reticles.

The presence of thermal gradients in the search system has other adverse effects. In particular, if the search system employs an array of detectors, the position of these detectors with respect to each other is critical, and these positions can be disturbed by thermal gradients. Additionally, if these detectors are mounted on a precisely curved surface, temperature differences in various parts of the surface can cause distortion and thereby adversely affect the system.

Under some circumstances careful mechanical design could minimize the disturbing effects of thermal gradients, however, this approach would be very costly, and in addition, the problem of minimizing reticle emission and increasing detector sensitivity would not be solved.

What is needed therefore and comprises an important object of this invention is to provide an infrared search system with a simple economical method for decreasing reticle emission, increasing detector sensitivity, and minimizing the effects of thermal gradients in the system.

Another object of the present invention is to provide a multi-element infrared detector assembly in which the reticle, field lens system and detector are cooled to provide extremely good background discrimination.

Another object of the present invention is to provide a novel method of and device for conserving coolant in a coolable detector assembly.

Another object of the present invention is to provide an infrared detector assembly utilizing a plurality of infrared cells and associated lens systems to provide good signal-to-noise ratios and an indication as to the exact target position within the instantaneous field of view of the assembly.

Another object of the present invention is to provide an infrared detector asesmbly which is ideally suited for utilization in those applications wherein a scanning type operation is employed.

Other and further objects and advantages of the present invention will become apparent to one skilled in the art from a consideration of the following detailed description when read in light of the accompanying drawings in which:

FIGURE 1a is a cutaway side view of the left portion of an infrared detector assembly constructed according to the principles of the invention;

FIGURE 1b is a continuation from FIGURE 1a of the infrared detector assembly showing the right portion;

FIGURE 2 is a sectional view taken on the line 2—2 of FIGURE 3 and showing one of the plurality of lens-cell units utilized in the present invention;

FIGURE 3 is a top view illustrating the arrangement of the lens-cell units in array configuration; and FIGURE 4 is a detailed view of the reticle pattern employed in the present invention.

Briefly, the preferred embodiment of the present invention is an elongated evacuated coolable Dewar chamber having a cold chamber therein with two staggered rows of infrared cells and associated lenses in thermal contact therewith. Each of the lens-cell units "see" only a small part of the total space in the instantaneous field of view of the system and a reticle is utilized to further subdivide the volume of space that each lens-cell unit sees into a number of smaller segments approaching the minimum blur size of the optical system.

Referring now to FIGURES 1a and 1b of the drawings, an infrared detector system indicated generally by the reference numeral 40 comprises a cylindrical Dewar flask 1 which is coated with an infrared shielding material such as silver. A vacuum chamber 2 is contained therein which is separated from a vacuum-getter chamber 3 by a cylindrical wall member 4. Communication between chambers 2 and 3 is through opening 5 which is covered by a small mesh getter screen. The Dewar flask 1 narrows to an elongated cylindrical pump mount 7 having an opening 8 therein which is sealed against loss of vacuum through any conventional means (not shown). The getter chamber 3 contains a getter which upon cooling absorbs air molecules and upon heating releases them. Thus, such a getter is ideally suited for use in the present Dewar where, as is hereinafter described, cooling is employed. In this manner, the vacuum of the chambers 2 and 3 is increased, upon cooling, to a greater extent than is possible through utilization of vacuum pumps alone.

Also contained within the Dewar flask 1 is a cylindrical container support 9. The container support includes a tubular container portion 32 and a cup-shaped guide portion 34. The cup-shaped guide portion is seated in a cup-receiving opening 36 formed in the end of the Dewar flask 1. In this way the container portion 32 is thermally separated from the outer wall of the Dewar flask 1 by the vacuum chamber 2. As seen the container portion 32 extends through the base or vacuum wall 10 of the cup-shaped guide portion 34.

The vacuum wall 10 is integral with the container portion 32 to provide a vacuum tight seal therebetween. The container support 9 may be glass and is everywhere coated with a thermal shielding material. An array holder assembly 11 is mounted on the external surface of the container portion 32, and this portion has an opening at one end 14 to permit entrance of a coolant therein so that, as will become apparent below, the container portion serves as a heat sink or a cold chamber.

Assembly 11 is in good thermal contact with the container portion 32 for reasons to become apparent below. Leads 12–12n, which as will hereinafter be explained, are each connected to one of the infrared cells extending out from assembly 11 along container portion 32. The leads may be of the printed circuit type or they may be wires encapsulated in glass tubing 30 to prevent microphonics. An optical window 13 formed from a material having suitable infrared transmission characteristics is provided. This window is in optical association with the cell holder 11 so that, as will hereinafter be described, radiant energy from the area of interest is allowed to pass through the infrared entrance window 13 onto the plurality of lens-cell units held by the assembly 11. In dealing with radiation frequencies 3.5 microns and below, the entrance windows made of fused quartz or germanium while in the longer wavelength regions, entrance windows of lithium fluoride or Irtran are satisfactory.

The typical leads 12–12n, as shown, are electrically connected to pins 15–15n, respectively, which are sealed in vacuum wall 10. Leads 16–16n are attached to pins 15–15n, respectively, and passed out of the rear chamber 17 where the electrical signals appearing thereon are utilized in accordance with the particular display or tracking system employed. As shown in FIGURE 1, the leads 16–16n are wire encapsulated in glass tubing 38 for the prevention of microphonics or they may be of the printed circuit type. The leads 16–16n pass through chamber 17 and are supported by rear support member 18. This member has an opening 19 therein for introduction of the coolant to the container portion 32. The rear support member 18 is removably mounted on the end of guide portion 34.

The vacuum wall 10 is snugly received within the Dewar flask 1 and a ground joint exists between the two which contains a vacuum sealant to prevent loss of vacuum through the joint. A slight flange 20 is provided in the Dewar flask 2 to facilitate insertion of the vacuum wall member 10. In this way, the container support 9 including container portion 32 with the assembly 11 containing the detectors and leads are mounted as a unit in the Dewar flask 1.

The container support 9 contained within the Dewar flask 1 is filled with a coolant, the particular type of which depends upon the type of infrared cell utilized. For instance, in the present application where lead selenide cells are utilized, liquid nitrogen is desirable. The liquid nitrogen is inserted into the container support or cold chamber 9 through the opening 14. The opening 14 need not be sealed. Instead in this embodiment, the device, in its operable position, stands with the opening 14 up such that the coolant is not spilled into chamber 17.

The reticles, lenses, and cells in a special configuration, as will be hereinafter described, are located in the special steel assembly 11 which is soldered or otherwise attached to the chamber 9 of the Dewar flask, thereby assuring that all of these elements will be at substantially the temperature of the liquid coolant.

In FIGURE 2 a detailed side view of one of the lens-cell units 20 utilized in the present system is shown. The lens-cell unit 20 is held in a suitable holder 21 and cemented thereto. Each lens-cell unit 20 comprises a first field lens 22 which has a reticle pattern 29 deposited directly thereon as best shown by FIGURE 3. A second field lens 24 is in optical association with the first field lens 22 and separated therefrom by spacers 23. Thus, a physical gap 25 exists between the first field lens 22 and the second field lens 24. Deposited on the back side of the second field lens 24 or immersed therein is an infrared cell 26 which is preferably of the photo conductive type. Lead wires 27 and 28 connect the infrared cell 26 to related equipment which utilizes the electrical output of the cell 26.

The first field lens 22 is made of a material which is transparent to infrared radiation and which has a suitable index of refraction. The second field lens 24 is also transparent to infrared energy and serves to collimate a beam passing through the reticle 29 onto the cell 26.

The field lens system 20 is made to act as a spectral filter as well as acting as a support for the deposited reticle pattern. The lenses 22 and 24 are preferably fabricated of germanium and coated for optimum transmission in the desired spectral region.

To provide a higher degree of discrimination against background, spacial filtering in the form of a scanning reticle, which modultes the energy from a point source target but does not fully modulate the energy from an area target, such as cloud edges and horizons, is employed. The reticle 29 as best shown in FIGURE 3 consists of fourteen opaque bars, separated by thirteen transparent spaces, deposited on the front side of the field lens 22. The width of the reticle bar is determined by the limit of blur size capability when considered in light of thermal de-focusing and vibration of the optical system.

Refer next to FIGURE 4 wherein is shown a frontal view of the detector array utilized in the present system. As shown in FIGURE 4, a total of forty-five lens-cell units are employed in the array; these detectors are arranged in two staggered rows with the top row comprising twenty-three detectors and the bottom row comprising twenty-two detectors. The rows are vertically staggered to provide an overlap which eliminates dead zones between units.

While in the herein described embodiment, a total of forty-five lens-cell units are combined into an array, it is of course apparent that the number of units need not be forty-five, but may be any number as required by the application. As heretofore mentioned, the forty-five lens-cell units 20 shown in FIGURE 4 are contained in the special steel array assembly 11. Assembly 11 is mounted in thermal contact with the container support 9 inside the Dewar flask 1. This maintains the assembly at a low temperature and thereby cools the reticle 29, field lenses 22 and 24, and infrared cells 26 to the temperature of liquid nitrogen. Thus, by cooling the reticles 29 thermal emission from the reticle is minimized. In addition, cooling the detectors increases their sensitivity. Consequently, the search system has great sensitivity and a low "noise" level, so it can discriminate between the target and background radiation. Furthermore, by maintaining assembly 11 at a constant temperature i.e. the temperature of liquid nitrogen, thermal gradients are eliminated because the assembly acts as a heat sink. Consequently, the detectors maintain a fixed position with respect to each other and the position of the reticles with respect to the focal plane of the system is not disturbed.

As is obvious in certain applications, an optical system must be utilized in conjunction with the herein described multiple array detector. For instance, suitable type of optical scanner (not shown) is described in a co-pending application Ser. No. 172,586, filed Feb. 12, 1962, which is assigned to the Assignee of the subject invention. For purposes of the present invention, the particular type of optical system utilized herewith is not important. It need only be of the type wherein infrared radiation within the field of view of the optical system is caused to fall on the array of the herein described system. One such type system is of the rotating type wherein an optical receiver head is caused to rotate through 360° scan focused upon the array. The output of the array is, of course, synchronized with the azimuth and elevation of the scanning head to provide an indication of the spatial location of the field of view of the scanning head at any particular time. A more exact target position is then provided by identifying which particular detector in the array saw the target.

Many times, particularly with distant targets, the amount of radiation received by the detector from the background within the field of view of the optical system is much greater than the radiation received from targets. However, by taking advantage of the fact that the target is a point source, it is possible to discriminate against this background radiation by utilizing a multiple cell array. Thus, each lens 22 sees only a small volume of space and the reticle 29 subdivides this volume into a number of smaller segments approaching the minimum blur size of the optical system in the direction of scan. Thus, the background is modulated at a different frequency than the target. In the herein described system wherein fourteen reticle bars are utilized and assuming a hypothetical scan of the associated optical system of 54.7° per second, the fourteen reticle bars will produce a frequency of 2553 cycles per second.

Spatial filtering of the present invention is accomplished by means of the scanning reticle 29 contained in the detector array. Reticle width is determined by the image quality of the optical system. It is desirable to use very narrow reticle openings to minimize the modulation of the background energy. Thus, as heretofore mentioned, the scanning device chops the incoming radiation from a point source at a fixed frequency as determined by the angular rate of rotation of the associated optical system. The chopped or modulated infrared energy is then sensed by the plurality of cells 26 which generate a frequency signal in response to the incoming point source target. The frequency thus derived is amplified and filtered and demodulated in associated electronic equipment (not shown). The demodulated output is then synchronized with azimuth and elevation output signals indicating the spatial location of the associated optical systems field of view to provide an output which may be visually displayed by any suitable or well known display device, such as a cathode ray oscilloscope or may be used to provide slew signals to trackers or other related equipment.

In the above described manner, there has been provided a novel infrared detection system which is ideally suited for utilization in conjunction with a scanning optical system to detect and locate any infrared target which may enter the field of view of the associated optical system. Likewise, the array of the herein described invention is ideally suited to provide extremely good target to background ratios which allows identification of targets at relatively large distances in many instances where present infrared systems could not detect the presence of the target due to the relatively large amount of background radiation falling upon the detector.

In addition, there has been provided a multi-infrared detector assembly which can be utilized in conjunction with an associated rotating optical system to provide a highly accurate spatial indication of a detected target. Thus, not only is the electrical output of the array assembly synchronized with the field of view of the associated optical system but in addition due to the utilization of a plurality of individual detectors, the individual output of each of the detectors can be sensed to identify upon which detector the target radiation is falling. Thus, a highly accurate spatial indication of the location of the infrared target is provided.

While there has been described what is considered to be the preferred embodiment of the invention, it will be obvious to those skilled in the art that various changes and modifications may be made therein without departing from the invention, and it is aimed in the appended claims to cover all such changes and modifications as fall within the true area and scope of the invention.

What is claimed is:

1. An infrared detector assembly comprising: a support; a plurality of radiation sensitive units mounted on said support; each radiation sensitive unit comprising, an individual optical system and an infrared detector; reticle means associated with the optical systems; and means both for maintaining said support and said radiation sensitive units at a constant temperature and for minimizing thremal emission from said reticle means.

2. An infrared detector assembly comprising: a support; a plurality of radiation sensitive units mounted on said support; each radiation sensitive unit comprising, an individual optical system and an infrared detector; reticle means associated with the optical systems; and combined means for maintaining said support and said radiation sensitive units at a constant temperature for increasing detector sensitivity and for minimizing thermal emission from said reticle means.

3. The infrared detector assembly described in claim 2 wherein said combined means comprises, a low temperature heat sink in thermal association with each radiation sensitive unit.

4. The infrared detector assembly described in claim 3 wherein said low temperature heat sink comprises, a container; said radiation sensitive units mounted on the external surface of the container; and the interior of said container filled with liquid nitrogen.

5. The infrared detector assembly described in claim 4 wherein said liquid nitrogen filled container and said radiation sensitive units are mounted inside of an evacuated container to minimize heat conduction to said liquid nitrogen filled container.

6. The apparatus of claim 5 in which the vacuum chamber is divided into first and second subchambers separated by a fine mesh screen, said first subchamber containing a getter material and said second subchamber receiving said cold chamber.

7. An infrared detector assembly for detecting infrared radiation within an instantaneous area of interest comprising: a plurality of lens-cell units arranged in array configuration, array housing means for holding said plurality of lens-cell units, and a Dewar flask having an internal cold chamber and an entrance window, said array housing means being in thermal contact with said cold chamber and aligned such that the plurality of lens-cell units held thereby are in optical association with said entrance window.

8. An infrared detector assembly for detecting infrared radiation within an instantaneous area of interest comprising: a plurality of lens-cell units arranged in array configuration, each of said lens-cell units comprising a first field lens in optical association with said area of interest, a second field lens in optical association with said first field lens, and an infrared cell in optical association with said second field lens, array housing means for holding said plurality of lens-cell units, and a Dewar flask having an internal cold chamber and an entrance window, said array housing means being in thermal contact with said cold chamber and aligned such that the plurality of lens-cell units held thereby are in optical association with said entrance window.

9. An infrared detector assembly for detecting infrared radiation within an instantaneous area of interest comprising: a plurality of lens-cell units arranged in array configuration, each of said lens-cell units comprising a first field lens having a reticle deposited thereon in optical association with said area of interest, a second field lens in optical association with said first field lens, an infrared cell of the photoconductive type in optical association with said second field lens, array housing means for holding said plurality of lens-cell units, and a Dewar flask having an internal cold chamber and an entrance window, said array housing means being in thermal contact with said cold chamber and aligned such that the plurality of lens-cell units held thereby are in optical association with said entrance window.

10. An infrared detector assembly for detecting infrared radiation within an instantaneous area of interest comprising: a Dewar flask, a vacuum chamber in said Dewar flask, a cold chamber within said vacuum chamber, an array housing in thermal contact with said cold chamber, a vacuum tight infrared entrance window in said Dewar flask, and a plurality of lens-cell units held by said array in thermal contact with said cold chamber and in optical alignment with said infrared entrance window.

11. An infrared detector assembly for detecting infrared radiation within an instantaneous area of interest comprising: a Dewar flask, a vacuum chamber in said Dewar flask, a cold chamber within said vacuum chamber, an array housing in thermal contact with said cold chamber, a vacuum tight infrared entrance window in said Dewar flask, and a plurality of lens-cell units held by said array in thermal contact with said cold chamber and in optical alignment with said infrared entrance window, each of said lens-cell units comprising a first field lens in optical association with said area of interest through said infrared entrance window, a second field lens in optical association with said first field lens, and an infrared cell in optical association with said second field lens.

12. An infrared detector assembly for detecting infrared radiation within an instantaneous area of interest comprising: a Dewar flask, a vacuum chamber in said Dewar flask having first and second subchambers separated by a fine mesh screen, a getter in said first subchamber, a cold chamber in said second subchamber, an array housing in thermal contact with said cold chamber, a vacuum tight infrared entrance window in said Dewar flask, a plurality of lens-cell units held by said array in thermal contact with said cold chamber and in optical alignment with said infrared entrance window, each of said lens-cell units comprising a first field lens having a reticle thereon in optical association with said area of interest through said infrared entrance window, a second field lens in optical association with said first field lens, and an infrared cell in optical association with said second field lens.

13. An infrared detector assembly for detecting infrared radiation within an instantaneous area of interest comprising: a plurality of lens-cell units arranged in array configuration, each of said lens-cell units comprising a first field lens in optical association with said area of interest, a second field lens in optical association with said first lens, and an infrared cell in optical association with said second field lens, means for holding and cooling said plurality of lens-cell units, and getter means responsive to cooling to absorb air molecules.

References Cited by the Examiner
UNITED STATES PATENTS

| | | | |
|---|---|---|---|
| 2,953,529 | 9/60 | Schultz | 250—83.3 |
| 2,975,284 | 3/61 | Osborne | 250—83.3 |
| 2,980,763 | 4/61 | Lasser | 250—83.3 |
| 2,997,595 | 8/61 | Cary | 250—83.3 |
| 3,009,629 | 11/61 | Garin | 313—7 |
| 3,035,175 | 5/62 | Christensen | 250—83.3 |
| 3,038,996 | 6/62 | Grube | 250—83.3 |
| 3,073,957 | 1/63 | Jones | 250—83.3 |

RALPH G. NILSON, *Primary Examiner.*